(12) United States Patent
Sullivan

(10) Patent No.: US 9,137,978 B1
(45) Date of Patent: Sep. 22, 2015

(54) UNIVERSAL TIPPING ROD HOLDER FOR ICE FISHING

(71) Applicant: James A. Sullivan, Eau Claire, WI (US)

(72) Inventor: James A. Sullivan, Eau Claire, WI (US)

( * ) Notice: Subject to any disclaimer, the term of this patent is extended or adjusted under 35 U.S.C. 154(b) by 301 days.

(21) Appl. No.: 13/709,992

(22) Filed: Dec. 10, 2012

Related U.S. Application Data

(60) Provisional application No. 61/630,388, filed on Dec. 12, 2011.

(51) Int. Cl.
| | | |
|---|---|---|
| *A01K 97/12* | (2006.01) | |
| *A01K 97/01* | (2006.01) | |
| *A01K 97/10* | (2006.01) | |
| *A01K 97/11* | (2006.01) | |

(52) U.S. Cl.
CPC .................. *A01K 97/01* (2013.01); *A01K 97/10* (2013.01); *A01K 97/11* (2013.01); *A01K 97/12* (2013.01)

(58) Field of Classification Search
CPC ....... A01K 97/01; A01K 97/11; A01K 97/12; A01K 97/125
USPC ............................................................. 43/16
See application file for complete search history.

(56) References Cited

U.S. PATENT DOCUMENTS

| | | |
|---|---|---|
| 5,050,333 A | 9/1991 | Debreczeni |
| 5,152,093 A | 10/1992 | Bartys |
| 5,313,734 A | 5/1994 | Roberts |
| 5,992,080 A | 11/1999 | Allen |
| 6,079,142 A | 6/2000 | Danser et al. |
| 6,421,948 B1 | 7/2002 | Craig |
| 7,316,094 B1 | 1/2008 | Bishop |
| 7,739,827 B2 | 6/2010 | Keller |
| 8,453,371 B1 * | 6/2013 | Sullivan ........................ 43/19.2 |
| 2012/0151818 A1 * | 6/2012 | Orth ................................ 43/4.5 |

* cited by examiner

*Primary Examiner* — Christopher P Ellis
*Assistant Examiner* — Jessica Wong
(74) *Attorney, Agent, or Firm* — Tipton L. Randall

(57) ABSTRACT

A tipping rod and reel holder comprises an upright support with a rod and reel holder member slidably secured thereto. The rod and reel holder member includes a closed, linear, fulcrum slot with a fastener slidably fastening it to the upright support. The rod and reel holder member accepts the handle of a fishing rod therein, with the shank of the fishing reel positioned in an L-shaped slot in the holder member. The rod and reel holder member with a fishing rod and reel therein is slidably positioned on the fastener to maintain the fishing rod and reel essentially horizontal. A fish pulling on the line pivots the rod and reel holder member with rod and reel therein on the fastener, causing the rod and reel to slide within the L-shaped slot, further pivoting the rod and reel holder member away from horizontal to indicate a bite.

16 Claims, 6 Drawing Sheets

UNIVERSAL TIPPING ROD HOLDER FOR ICE FISHING

CROSS-REFERENCE TO RELATED APPLICATIONS

This application claims the benefit under 35 U.S.C. §119 (e) of provisional application Ser. No. 61/630,388, filed 12 Dec. 2011. application Ser. No. 61/630,388 is hereby incorporated by reference.

BACKGROUND OF THE INVENTION

1. Field of the Invention

The present invention relates generally to a rod holder device, and more specifically it relates to a tip down rod holder device. Most particularly, the invention relates to a tip down rod holder device that signals a fisherman when a fish is on the line.

2. Background Information

Fishing with a rod and reel combination is a common method of catching fish. When fishing, the fisherman cannot always be holding the pole when a fish bites. A number of devices have been developed that hold the rod and reel, as well as indicate when a fish has take the bait. Numerous patents have been issued that disclose devices that are used to hold the fishing pole and indicate that a fish has take the bait.

Some of the patents which have been granted include Debreczeni, U.S. Pat. No. 5,050,333, which describes a portable knockdown fishing rig, that includes a base, a fishing rod support, a flag and staff having its lower end mounted to the base. The flag and staff at its upper end is loosely engaged to a line, which is connected to a triggering mechanism, also mounted to the support. A pulling force exerted on the fishing line causes the triggering mechanism to release the flag staff, thus indicating the catch of a fish. In one embodiment, the upper part of the support is so shaped as to oppose tilting of the entire fishing rig when an important pulling force is exerted.

In U.S. Pat. No. 5,152,093, Bartys discloses a fishing tip-up construction for a rod on which is mounted a supporting stand having a pair of legs, movable between retracted and extended positions. The rod terminates at one end in a downwardly bent grip, which, together with the legs, forms a stable three-point support for the rod. A fishing line is wound on a reel that is supported on the rod between the grip and the stand. A signal device is movable from an inactive position to a signaling position in response to the application in one direction of a force on the fishing line. The force required to effect movement of the signaling device to the signaling position is adjustable.

Roberts, in U.S. Pat. No. 5,313,734, describes a fishing rod holder for casting and spinning reels including a holster portion for receiving a rod and a flexible clamp rotatably mounted in a recess on one end of the holster for retaining a reel within the holster. The flexible clamp is discontinuous with an opening less than the diameter of the circumferential slot, whereby the opening must be widened by flexing the clamp when assembling the clamp in the recess. The holster includes support flanges extending therefrom and straddling the recess for supporting the clamp in the recess and for providing stops to the rotation of the clamp when locking a rod in the holster or when releasing the rod from the holster.

In U.S. Pat. No. 5,992,080, Allen discloses a fish trap system comprising a support, having a lower end and an upper end with a pivot pin there through. A fishing rod has a reel end with a reel coupled thereto and an eye end with a first eye coupled thereon, with line extendable from the reel through the fist eye to a hook with bait. The fishing rod further has an aperture at its central extent for pivotally coupling to the pivot pin, with an end aperture facing downwardly adjacent to the first edge. Also included is a trip rod, having an interior end pivotally coupled to the lower end of the support and having an exterior end with a second eye in proximity to the first eye on the side thereof remote from the reel. The trip rod has a supplemental pin adjacent to the exterior end extending upwardly to receive into the end aperture of the fishing rod. A resilient member is provided in tension coupling the first end of the reel rod and the lower end of the support, tending to urge the reel end of the rod downwardly.

Danser et al., in U.S. Pat. No. 6,079,142, describe an ice fishing system having a post with a lower end and an upper end. Also included is a fishing pole, pivotally coupled to the upper end of the post with fishing line depending from an end thereof. The device includes a vertically disposed post which has a large U-shaped notch at its upper end for receiving a fishing pole and a small U-shaped notch at the upper end for receiving a pivot pin. The notches are at right angles with respect to each other. A lower end of the post is equipped with a disk-shaped recess formed therein. A planar rectangular base is provided with an upstanding cylindrical projection for frictionally receiving the lower end of the post. The base also has two upwardly extending resilient U-shaped clamps. Such clamps include a large clamp for receiving the post and a small clamp for receiving the fishing pole. The clamps are positioned along a center line of the base such that the post and pole flank the vertical projection and remain in parallel relationship while being stored. The fishing pole is equipped with an aperture which extends through the center thereof. The pivot pin extends through the hole. During use, the pivot pin rests on the small notch such that the pole may be pivoted within the large notch. The fishing pole also includes a hole through one end thereof for the passage of fishing line there through. The hole preferably resides about a vertical axis, which is perpendicular with respect to both the pivot pin and axis of the pole. Also provided is a rotatable disk-shaped reel with a line secured to the post about a vertical axis. The reel has an associated bolt which extends upwardly from the pole and through the reel with an associated wing nut to vary the force needed to pull line from the reel and further allow the removal thereof. For manually dispensing and retracting the line, the reel preferably has a handle eccentrically mounted on the reel. A vertically extending eyelet is coupled to the pole between the reel and the hole for guiding the movement of string there through.

In U.S. Pat. No. 6,421,948, Craig discloses a rod holder and signaling device for holding a fishing pole and signaling when a fish strikes a bait or lure. The device is compact and is adaptable to secure the fishing rod to various structures. The fishing rod may then be temporarily abandoned or remotely monitored by the angler. The rod holder includes a clamping device, which is adapted to clamp over a variety of support structures to securely mount the fishing pole at a targeted fishing location. Preferably, the rod holder is pivotable relative to the clamping device to adjust an angle of the rod with respect to the clamping device and the support structure. The signaling device includes a flexible member, a signaling member, and a release mechanism rotatably mounted on the flexible member. The release mechanism is rotatable about the flexible member in response to tension being detected in the fishing line and rotates to disengage the release mechanism and thus the flexible member from a connector along the rod holder. The signaling device provides a visible and/or an audible signal to the angler when the signaling device is triggered. Preferably, the release mechanism is adapted to trigger the signaling device in response to a variable amount of tension in the line.

Bishop, in U.S. Pat. No. 7,316,094, describes a fishing apparatus having a pivot arm mounted on a frame with a fishing line played out on one end of the pivot arm via a flexible fishing rod and a hooking mechanism connected to the opposite end via a trigger line and a pull line. The hooking mechanism resembles a mouse trap with a trigger connected to the trigger line arm, a retaining arm engaging the trigger and retaining a spring-loaded arm in the set position. The spring-loaded arm is connected to the pull line. A fish trying to swim with the hook will cause the pivot arm to tip down, triggering the hooking mechanism. The spring-loaded arm pivots downward rapidly, pulling the pivot arm so that the fishing rod moves upward rapidly and sets the hook in the fish's mouth. The spring bias in the spring-loaded arm then keeps the fishing line under tension so that the fish doesn't release the hook without ripping the hook from the mouth.

In U.S. Pat. No. 7,395,628, Rayfield discloses a fishing system with audio and visual signals that is capable of use with both tip ups and tip downs. The fishing system includes a tower like tubular support extending from a base member configured to receive at least one tip down. The tubular support includes a tubular visual signal housed at a location on the support and an audio signal housed within the support. The tubular support includes a first wiring outlet configured for wiring a switch on the tip downs to the audio and visual signals and a second wiring outlet for wiring a switch on the tip ups to the audio and visual signals.

Keller, in U.S. Pat. No. 7,739,827, describes a holder for a rod and reel combination as may be used for ice fishing. The holder has an elongated arm pivotally supported on a wall, pail or fixture mounting bracket for adjustable movement in a horizontal plane. A tubular sleeve is pivotally attached to the arm for removably receiving and holding a rod and its reel in such an orientation that the rod points downwardly for selective positioning over an ice fishing hole. An alarm finger, movable between a restrained or cocked position and a tripped position, actuates an audible alarm attached to the arm. A fishing line engagement member is operatively associated with the alarm finger in such a way that when a fish strikes and pulls the line, the alarm finger is released from its cocked position and moves to its tripped position to actuate the alarm.

The present invention generally relates to a universal rod and reel holder for fishing, which includes an upright support that attaches to a unique holder, which is designed to balance the rod and reel in a horizontal orientation.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a tip down device with a universal rod and reel holder for hands-free support of a fishing pole.

Another object is to provide a tip down device with a universal rod and reel holder for fishing that allows fishermen to use several poles at one time, increasing the odds of catching more fish.

Another object is to provide a tip down device with a universal rod and reel holder for fishing that allows the use of most types of fishing poles.

Another object is to provide a tip down device with a universal rod and reel holder for fishing that indicates a fish bite by pulling the tip of the rod down and putting up a signal flag.

Another object is to provide a tip down device with a universal rod and reel holder for fishing that is simple to operate and functions smoothly in all types of weather.

Other objects and advantages of the present invention will become obvious to the reader and it is intended that these objects and advantages are within, the scope of the present invention. To the accomplishment of the above and related objects, this invention may be embodied in the form illustrated in the accompanying drawings, attention, being called to the fact, however, that the drawings are illustrative only, and that changes may be made in the specific construction illustrated and described within the scope of this application.

SUMMARY OF THE INVENTION

The invention is a tipping rod and reel holder adapted for ice fishing. The basic invention comprises an upright support with a rod and reel holder member slidably secured to the upright support. The rod and reel holder member includes a closed, linear, fulcrum slot with a fastener extending through the slot to slidably fasten the rod and reel holder member to the upright support. There is an L-shaped slot in the rod and reel holder member. The rod and reel holder member is sized to accept a handle of a fishing rod therein, with a shank of a fishing reel secured to the fishing rod. The shank is positioned in the L-shaped slot. The rod and reel holder member with a fishing rod and reel therein is slidably positioned on the fastener secured to the upright support to maintain the fishing rod and reel essentially horizontal. A fish pulling on the line of the fishing rod and reel pivots the rod and reel holder member with rod and reel therein on the fastener in the fulcrum slot, thus causing the rod and reel to slide within the L-shaped slot, thereby further pivoting the rod and reel holder member away from horizontal to indicate a bite.

More specifically, the invention is directed to a tipping rod holder for ice fishing. The tipping rod holder device includes a base section with an upright section extending therefrom. At the top of the upright section is mounted a rod and reel holder that reversibly accepts a rod and reel, preferably an ice fishing spinning rod and reel. The rod holder comprises a U-shaped body having an open top, open ends and opposed sides. The rod holder includes a linear fulcrum slot that is used to attach the rod holder to the upright section. A screw or similar connector is mounted in the slot and to the upright section such that the rod holder is free to move on the screw in the linear fulcrum slot. Opposite the linear slot is an L-shaped opening with one leg of the opening extending from an upper edge of the side of the U-shaped body opposite the linear slot. The other leg of the L-shaped opening extends parallel with the linear slot. In use, the handle of the spinning rod is placed within the U-shaped body, with the shank of the spinning reel in the L-shaped opening, but outside and below the U-shaped body. The rod and reel combination is positioned with the shank of the reel approximately at the intersection of the two legs of the L-shaped opening. The rod holder with rod and reel is then positioned horizontally by sliding the unit along the mounting screw on the upright section. A signal device, such as a flag or light, extends from the U-shaped body opposite the rod. When a fish takes the bait on the line of the rod and reel, the U-shaped body pivots slightly on the mounting screw. This causes the rod and reel to slide toward the closed leg end of the L-shaped opening, further tipping down the end of the rod. The signal device opposite the rod is elevated to signal the fisherman that a fish is on the line. The rod and reel combination is readily removed from the L-shaped slot to fight the fish.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE EMBODIMENTS

Nomenclature

Figure 1:
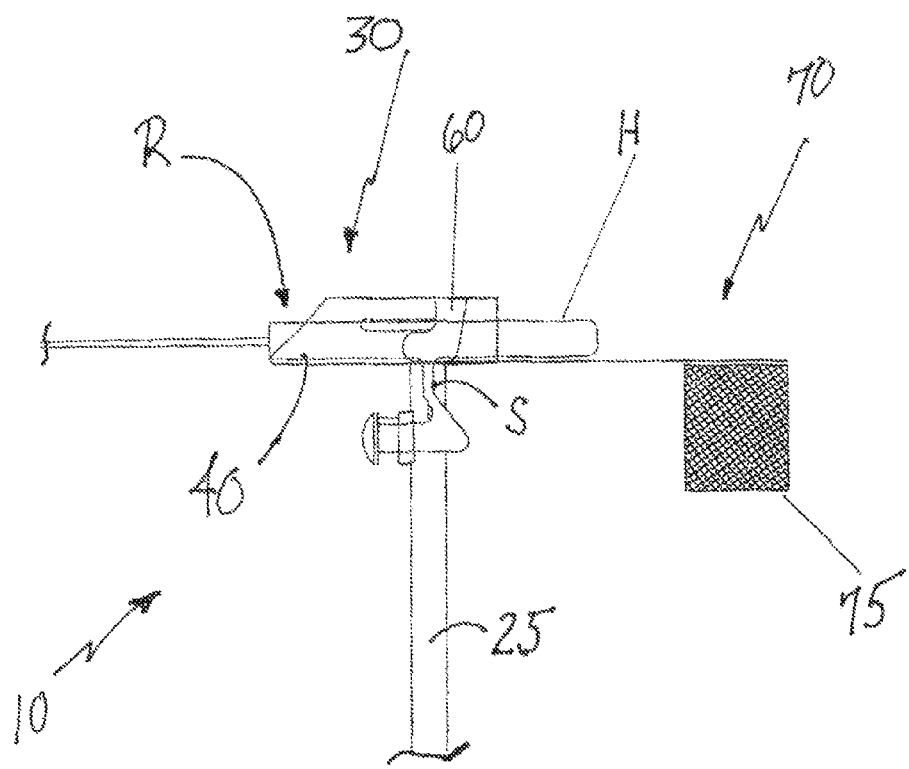
FIG. 1 is a side view of the tipping rod and reel holder of the present invention with a rod and reel supported horizontally therein.

10 Tipping Rod and Reel Holder
20 Base Section
22 Legs of Base Section
24 Center Bar of Base Section
25 Upright Support Section
30 Rod and Reel Holder Member
40 U-Shaped Body
42 Opposed Sidewalls of U-Shaped Body
44 Top Edge of Sidewalls
50 Closed Linear Fulcrum Slot
55 Fastener for U-Shaped Body
60 L-Shaped Slot
62 First Leg of L-Shaped Slot
64 Second Leg of L-Shaped Slot
70 Signal Member
75 Flag Signal Device
80 Light Signal Device
R Fishing Rod and Reel
H Handle of Rod
S Shank of Reel Construction The invention is a tipping rod and reel holder adapted for ice fishing. The basic invention comprises an upright support with a rod and reel holder member slidably secured to the upright support. The rod and reel holder member includes a closed, linear, fulcrum slot with a fastener extending through the slot to slidably fasten the rod and reel holder member to the upright support. There is an L-shaped slot in the rod and reel holder member. The rod and reel holder member is sized to accept a handle of a fishing rod therein, with a shank of a fishing reel secured to the fishing rod. The shank is positioned in the L-shaped slot. The rod and reel holder member with a fishing rod and reel therein is slidably positioned on the fastener secured to the upright support to maintain the fishing rod and reel essentially horizontal. A fish pulling on the line of the fishing rod and reel pivots the rod and reel holder member with rod and reel therein on the fastener in the fulcrum slot, thus causing the rod and reel to slide within the L-shaped slot, thereby further pivoting the rod and reel holder member away from horizontal to indicate a bite.

More specifically, the invention is directed to a tipping rod holder for ice fishing. The tipping rod holder device includes a base section with an upright section extending therefrom. At the top of the upright section is mounted a rod and reel holder that reversibly accepts a rod and reel, preferably an ice fishing spinning rod and reel. The rod holder comprises a U-shaped body having an open top, open ends and opposed sides. The rod holder includes a linear fulcrum slot that is used to attach the rod holder to the upright section. A screw or similar connector is mounted in the slot and to the upright section such that the rod holder is free to move on the screw in the linear fulcrum slot. Opposite the linear slot is an L-shaped opening with one leg of the opening extending from an upper edge of the side of the U-shaped body opposite the linear slot. The other leg of the L-shaped opening extends parallel with the linear slot. In use, the handle of the spinning rod is placed within the U-shaped body, with the shank of the spinning reel in the L-shaped opening, but outside and below the U-shaped body. The rod and reel combination is positioned with the shank of the reel approximately at the intersection of the two legs of the L-shaped opening. The rod holder with rod and reel is then positioned horizontally by sliding the unit along the mounting screw on the upright section. A signal device, such as a flag or light, extends from the U-shaped body opposite the rod. When a fish takes the bait on the line of the rod and reel, the U-shaped body pivots slightly on the mounting screw. This causes the rod and reel to slide toward the closed leg end of the L-shaped opening, further tipping down the end of the rod. The signal device opposite the rod is elevated to signal the fisherman that a fish is on the line. The rod and reel combination is readily removed from the L-shaped slot to fight the fish.

Figure 2:
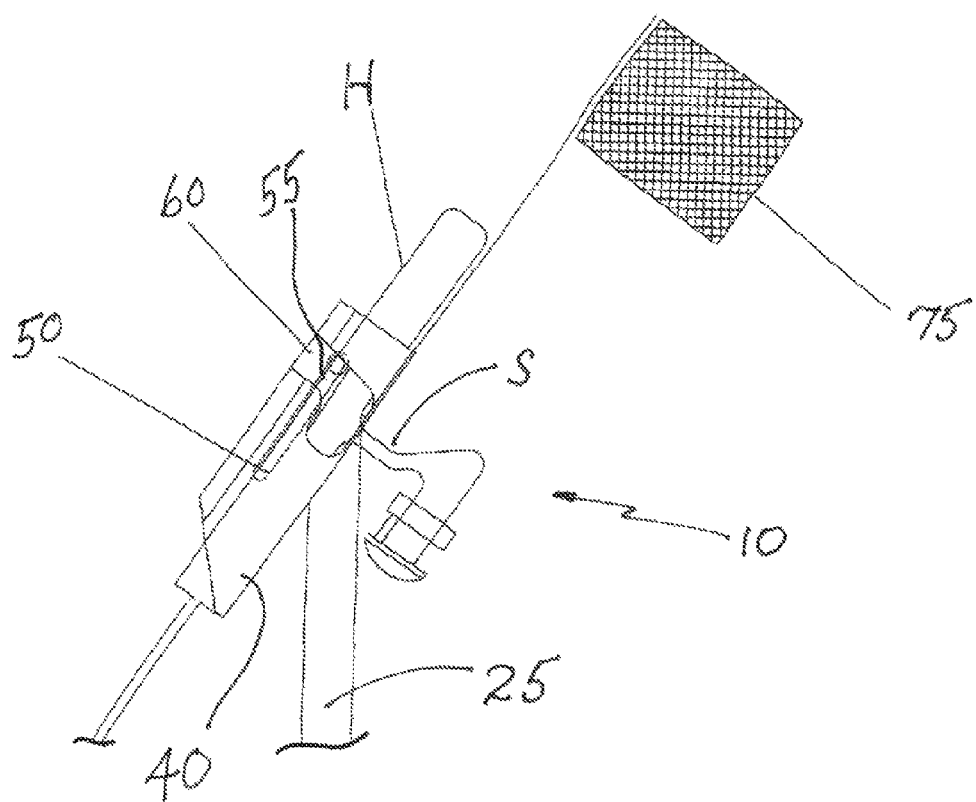
FIG. 2 is a side view of the tipping rod and reel holder of the present invention with a rod and reel therein indicating a bite.
Figure 3:
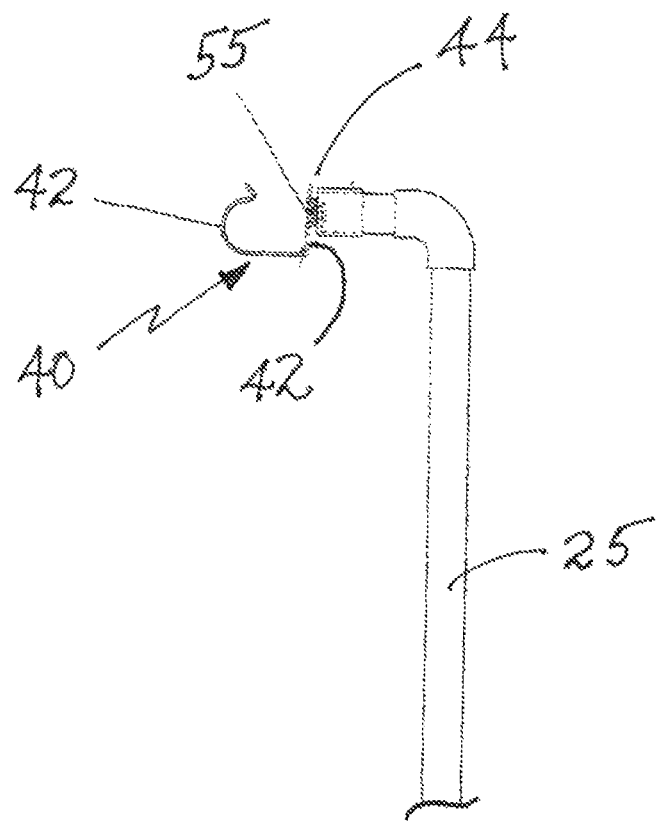
FIG. 3 is perspective rear view of the tipping rod and reel holder of the present invention.
Figure 4:
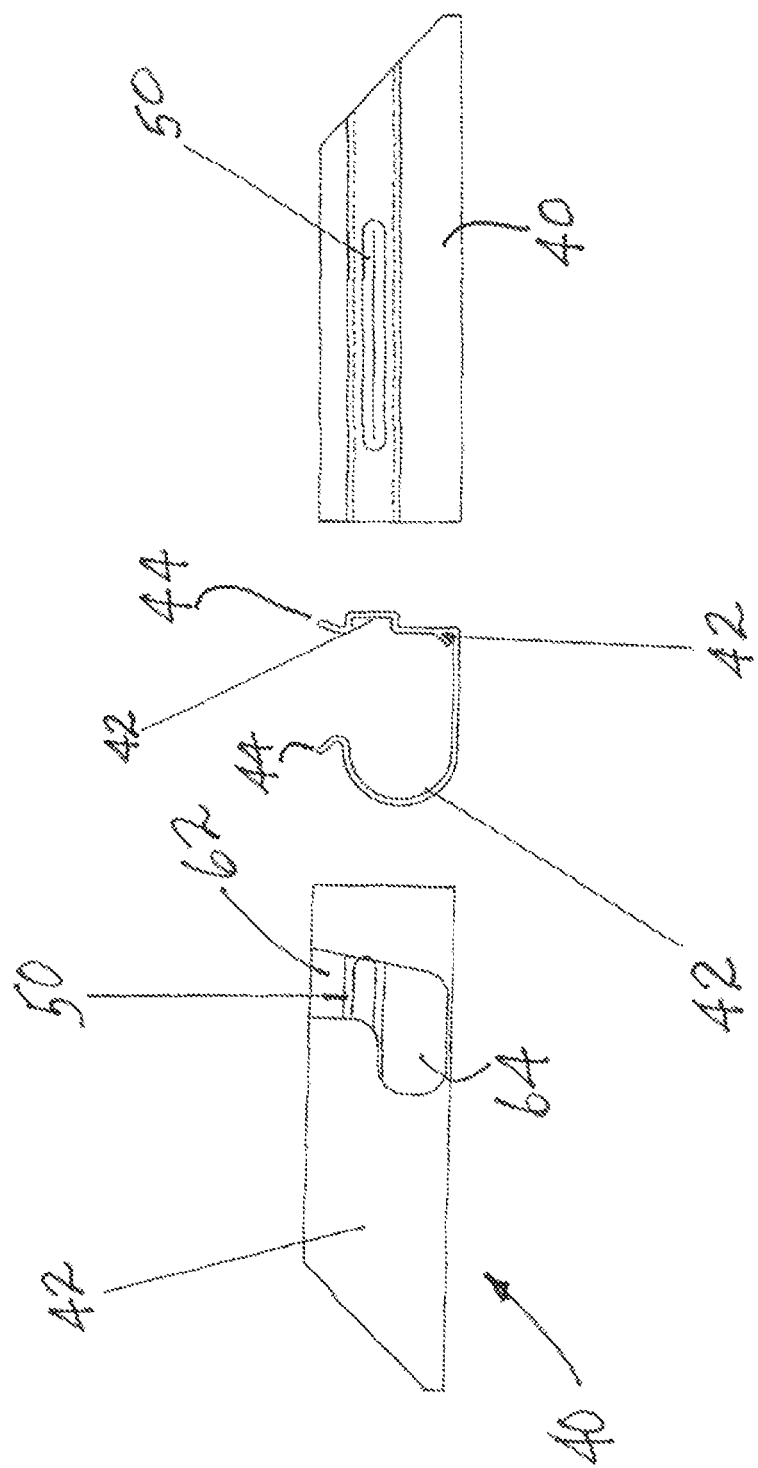
FIG. 4a is a side view of the U-shaped body of the tipping rod and reel holder of the present invention.
FIG. 4b is a rear view of the U-shaped body of the tipping rod and reel holder of the present invention.
FIG. 4c is an opposite side view of the U-shaped body of the tipping rod and reel holder of the present invention.
Figure 5:
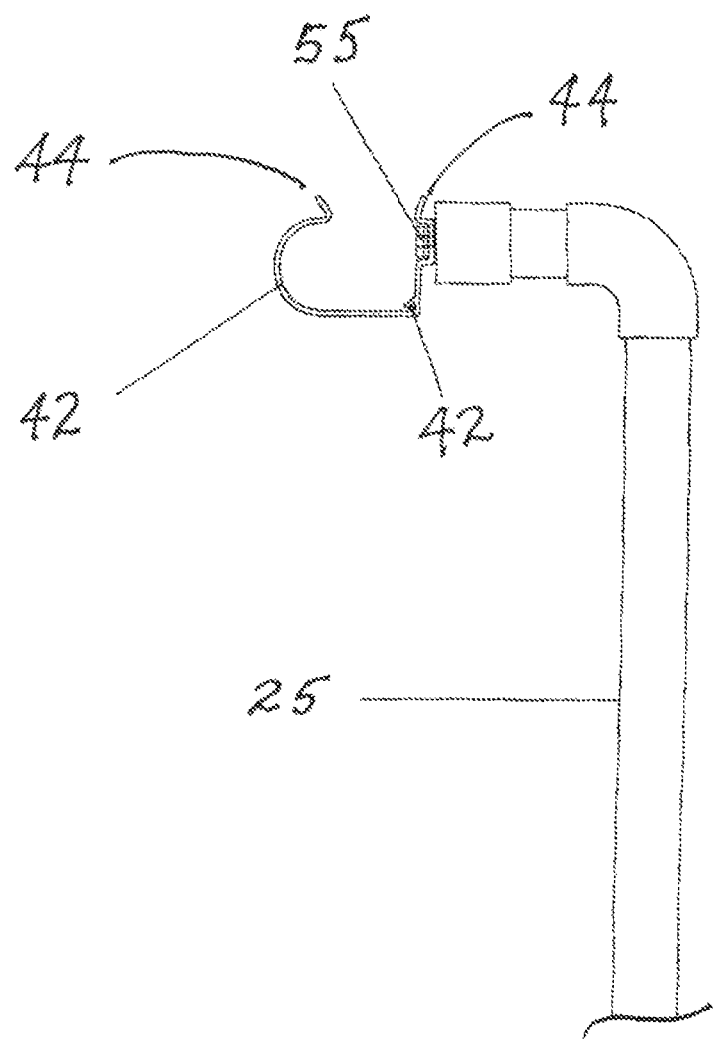
FIG. 5 is an enlarged perspective rear view of the tipping rod and reel holder of the present invention.

Turning now descriptively to the drawings, in which similar reference characters denote similar elements throughout the several views, FIGS. 1 and 2 provide views of the tipping rod and reel holder 10 adapted for ice fishing. The basic invention comprises an upright support section 25 with a rod and reel holder member 30 slidably secured to the upright support section 25. The rod and reel holder member 25 includes a closed, linear, fulcrum slot 50 (FIG. 4c) with a fastener 55 (FIG. 5) extending through the slot 50 to slidably fasten the rod and reel holder member 30 to the upright support 25. There is an L-shaped slot 60 in the rod and reel holder member 30 opposite the closed, linear, fulcrum slot 50, as shown in FIGS. 4a-4c. The rod and reel holder member 30 is sized to accept a handle H of a fishing rod therein, with the shank S of a fishing reel secured to the fishing rod handle H. The shank S is positioned in the L-shaped slot 60. The rod and reel holder member 30 with a fishing rod and reel R therein is slidably positioned on the fastener 55 (FIG. 5) secured to the upright support 25 to balance and maintain the fishing rod and reel R essentially horizontal. A fish pulling on the line of the fishing rod and reel R pivots the rod and reel holder member 30, with fishing rod and reel R therein, on the fastener 55 within the fulcrum slot 50, thus causing the shank S of the fishing rod and reel R to slide within the L-shaped slot 60, thereby further pivoting the rod and reel holder member 30 holding the fishing rod and reel R away from horizontal to indicate a bite.

Figure 6B:
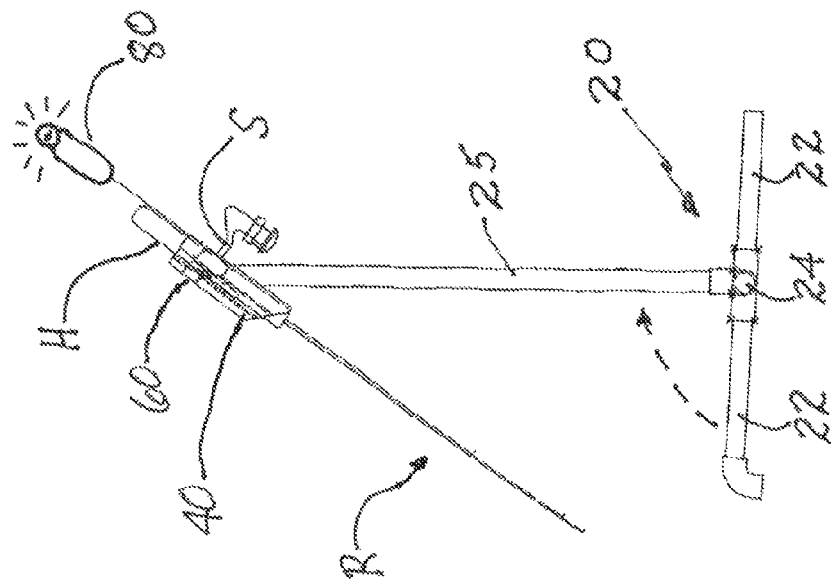
FIG. 6b is a perspective side view of the tipping rod and reel holder of the present invention with a rod and reel therein indicating a bite.
Figure 6A:
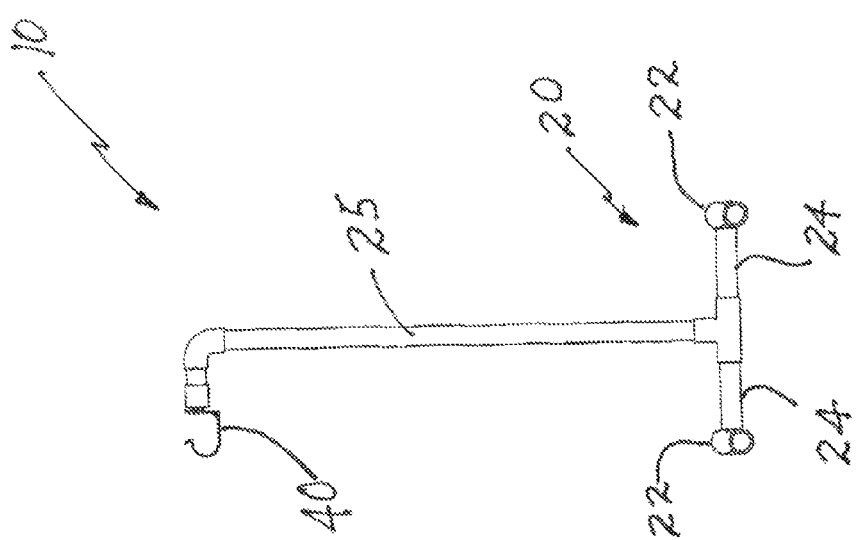
FIG. 6a is another perspective rear view of the tipping rod and reel holder of the present invention.

More specifically, the invention is a tipping rod and reel holder 10 for ice fishing. The tipping rod and reel holder device 10 includes a base section 20 with an upright section 25 extending therefrom, as shown in FIGS. 6a and 6b. Preferably, the base section 20 is H-shaped with parallel legs 22 and a center bar 24 there between. At the top of the upright section 25 is mounted a rod and reel holder 30 that reversibly accepts a fishing rod and reel R, preferably an ice fishing spinning rod and reel. The rod and reel holder 30 comprises a U-shaped body 40 having an open top, open ends and opposed sides 42, each with top edges 44 as shown in FIGS. 4a-4c. The U-shaped body 40 of the rod and reel holder member 30 includes a closed, linear fulcrum slot 50 that is used to attach the U-shaped body 40 of the rod and reel holder member 30 to the upright support section 25. A screw or similar fastener 55 is inserted from interior the U-shaped body 40 through the slot 60 and into the upright support section 25 such that the rod and reel holder member 30 is free to move on the screw 55 in the linear fulcrum slot 50. Opposite the linear fulcrum slot 50 is an L-shaped slot 60 with a first leg 62 of the slot opening 60 extending from a top edge 44 of the sidewall 42 of the U-shaped body 40 opposite the linear fulcrum slot 50. The second leg 64 of the L-shaped slot 60 extends parallel with the linear fulcrum slot 50. In use, the handle H of the fishing rod and reel R is placed within the U-shaped body 40, with the shank S of the spinning reel in the L-shaped slot 60, with the reel outside and below the U-shaped body 40. The rod and reel combination R is positioned with the shank S of the reel approximately at the intersection of the two legs 62, 64 of the L-shaped opening 60. The rod and reel holder member 30 with the rod and reel therein is then positioned horizontally by sliding the unit along the screw mounting fastener 55 on the upright support section 25. A signal member 70, such as a flag 75 or a light 80, extends from the U-shaped body 40 opposite the rod handle, as illustrated in FIGS. 1 and 2. When a fish takes the bait and pulls on the line of the rod and reel R, the U-shaped body 40 pivots slightly on the screw mounting fastener 55. This causes the rod and reel R to slide toward the closed end of the second leg 64 of the L-shaped slot 60, further tipping down the end of the rod. The signal member 70 opposite the rod is elevated to signal the fisherman that a fish is on the line. The shank S of the rod and reel R is readily removed from the L-shaped slot 60 to fight the fish.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect. It will be understood by those skilled in the art that various changes in form and details may be made therein without departing from the spirit and scope of the invention.

I claim:

1. A tipping rod and reel holder adapted for ice fishing comprising:

an upright support;

a rod and reel holder member slidably secured to the upright support, the rod and reel holder member including a linear, U-shaped body having an open top, open ends and opposed sidewalls with sidewall top edges extending between the open ends;

a first opposed sidewall having a closed, linear, fulcrum slot extending parallel with the top edge thereof, with a fastener extending through the closed, linear, fulcrum slot from interior the U-shaped body to slidably fasten the rod and reel holder member to the upright support; and an L-shaped slot in a second opposed sidewall of the rod and reel holder member;

whereby the rod and reel holder member is sized to accept a handle of a fishing rod therein, and with a shank of a fishing reel secured to the fishing rod, the shank positioned in the L-shaped slot;

whereby the rod and reel holder member with a fishing rod and reel therein is slidably positioned on the fastener secured to the upright support to maintain the fishing rod and reel essentially horizontal;

and whereby a fish pulling on the line of the fishing rod and reel pivots the rod and reel holder member with rod and reel therein on the fastener in the fulcrum slot, thus causing the rod reel to slide within the L-shaped slot, thereby further pivoting the rod and reel holder member to indicate a bite.

2. The tipping rod and reel holder adapted for ice fishing of claim 1, wherein the L-shaped slot in the rod and reel holder member is positioned in the second opposed sidewall of the U-shaped body, one leg of the L-shaped slot intersects the top edge of the second opposed sidewall and extending downward therefrom, and the other leg of the L-shaped slot extending parallel with the top edge of the second opposed sidewall.

3. The tipping rod and reel holder adapted for ice fishing of claim 1, further including a signal member attached to the U-shaped body of the rod and reel holder to signal a fish bite.

4. The tipping rod and reel holder adapted for ice fishing of claim 3, wherein the signal member is a flag.

5. The tipping rod and reel holder adapted for ice fishing of claim 3, wherein the signal member is a light device activated upon pivoting from a horizontal orientation to a vertical orientation.

6. A tipping rod and reel holder adapted for ice fishing comprising:

a base section secured to an upright support section;

a rod and reel holder member slidably secured to the upright support section, the rod and reel holder member including a linear, U-shaped body having an open top, open ends and opposed sidewalls with sidewall top edges extending between the open ends;

a first opposed sidewall having a closed, linear, fulcrum slot extending parallel with the top edge thereof;

a fastener extending from interior the U-shaped body through the closed, linear, fulcrum slot to slidably fasten the U-shaped body to the upright support section; and an L-shaped slot in the second opposed sidewall of the U-shaped body, one leg of the L-shaped slot intersects the top edge of the second opposed sidewall and extending downward therefrom, and the other leg of the L-shaped slot extending parallel with the top edge of the second opposed sidewall;

whereby the linear, U-shaped body is sized to accept a handle of a fishing rod therein with the handle parallel with the top edges of the opposed sidewalls, and with a shank of a fishing reel secured to the fishing rod, the shank positioned in the L-shaped slot;

whereby the linear, U-shaped body with fishing rod and reel therein is slidably positioned on the fastener secured to the support section to maintain the fishing rod and reel essentially horizontal;

and whereby a fish pulling on the line of the fishing rod and reel pivots the U-shaped body with rod and reel therein on the fastener in the fulcrum slot, thus causing the rod and reel to slide downward within the L-shaped slot, thereby further pivoting the U-shaped body to indicate a bite.

7. The tipping rod and reel holder adapted for ice fishing of claim 6, further including a signal member attached to the U-shaped body of the rod and reel holder to signal a fish bite.

8. The tipping rod and reel holder adapted for ice fishing of claim 7, wherein the signal member is a flag.

9. The tipping rod and reel holder adapted for ice fishing of claim 7, wherein the signal member is a light device activated upon pivoting from a horizontal orientation to a vertical orientation.

10. The tipping rod and reel holder adapted for ice fishing of claim 7, wherein the base section is H-shaped with a center bar portion with the upright support section secured to the center bar portion.

11. The tipping rod and reel holder adapted for ice fishing of claim 6, wherein the base section is pivotal from an orientation perpendicular to the upright support section to an orientation parallel thereto.

12. A tipping rod and reel holder adapted for ice fishing comprising:

a base section secured to an upright support section;

a rod and reel holder member slidably secured to the upright support section, the rod and reel holder member including a linear, U-shaped body having an open top, open ends and opposed sidewalls with sidewall top edges extending between the open ends;

a first opposed sidewall having a closed, linear, fulcrum slot extending parallel with the top edge thereof;

a fastener extending from interior the U-shaped body through the closed, linear, fulcrum slot to slidably fasten the U-shaped body to the upright support section;

an L-shaped slot in the second opposed sidewall of the U-shaped body, one leg of the L-shaped slot intersects the top edge of the second opposed sidewall and extending downward therefrom, and the other leg of the L-shaped slot extending parallel with the top edge of the second opposed sidewall; and a signal member attached to the U-shaped body of the rod and reel holder to signal a fish bite;

whereby the linear, U-shaped body is sized to accept a handle of a fishing rod therein with the handle parallel with the top edges of the opposed sidewalls, and with a shank of a fishing reel secured to the fishing rod, the shank positioned in the L-shaped slot;

whereby the linear, U-shaped body with fishing rod and reel therein is slidably positioned on the fastener secured to the support section to maintain the fishing rod and reel essentially horizontal;

and whereby a fish pulling on the line of the fishing rod and reel pivots the U-shaped body with rod and reel therein on the fastener in the fulcrum slot, thus causing the rod and reel to slide downward within the L-shaped slot, thereby further pivoting the U-shaped body to indicate a bite.

13. The tipping rod and reel holder adapted for ice fishing of claim 12, wherein the signal member is a flag.

14. The tipping rod and reel holder adapted for ice fishing of claim 12, wherein the signal member is a light device activated upon pivoting from a horizontal orientation to a vertical orientation.

15. The tipping rod and reel holder adapted for ice fishing of claim 12, wherein the base section is H-shaped with a center bar portion with the upright support section secured to the center bar portion.

16. The tipping rod and reel holder adapted for ice fishing of claim 12, wherein the base section is pivotal from an orientation perpendicular to the upright support section to an orientation parallel thereto.

\* \* \* \* \*